United States Patent Office 2,845,876
Patented Aug. 5, 1958

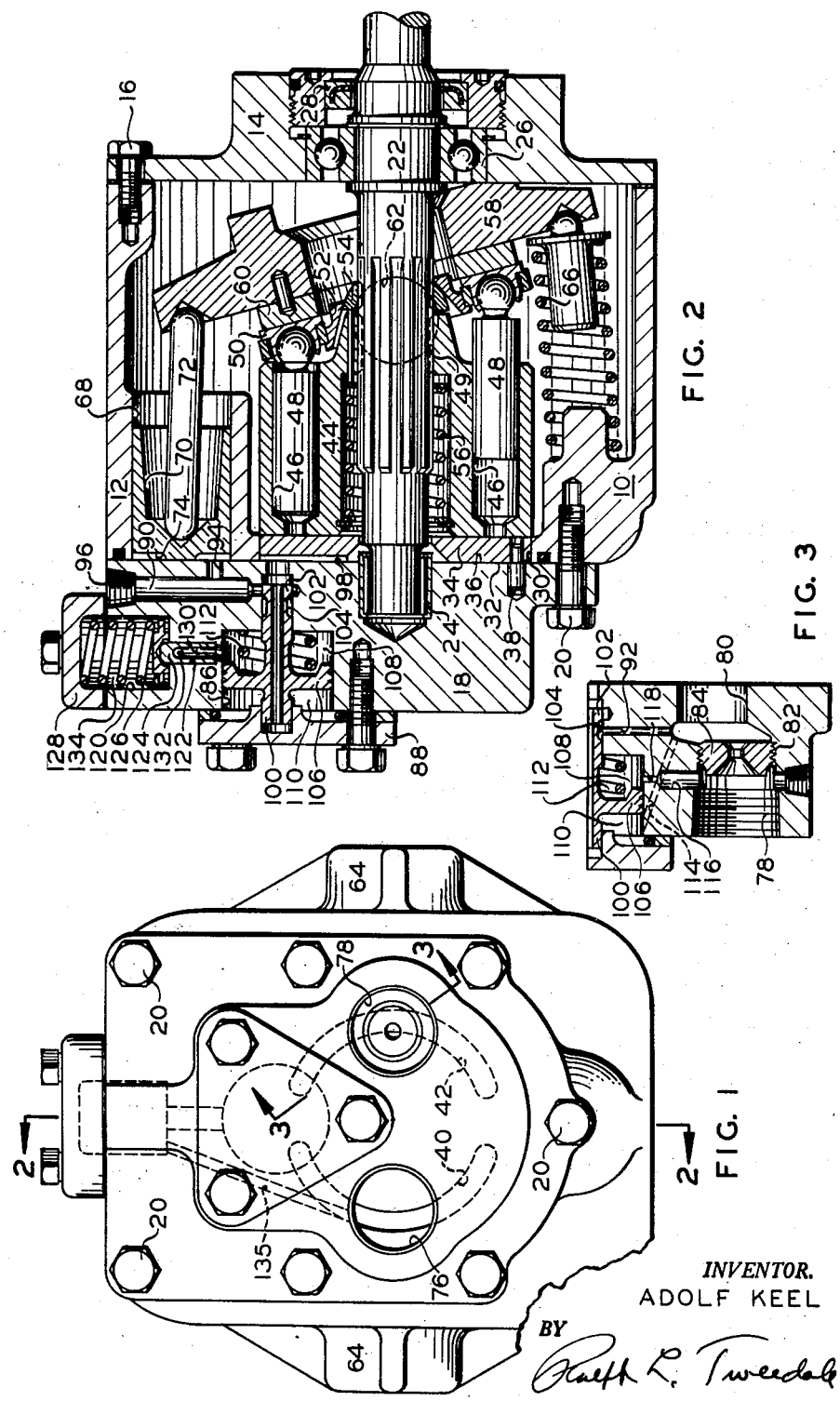

2,845,876

POWER TRANSMISSION

Adolf Keel, Highland Park, Mich., assignor to Vickers Incorporated, Detroit, Mich., a corporation of Michigan Application March 1, 1954, Serial No. 413,121

5 Claims. (Cl. 103—162)

This invention relates to power transmissions, and is particularly applicable to those of the type comprising two or more fluid pressure energy translating devices, one of which may function as a pump and another as a fluid motor.

More particularly, the invention relates to control means for variable pumping structure for use in such a transmission.

Automatic controls for variable displacement pumping structure are in wide use. The most commonly utilized systems of automatic control are those in which the pumping mechanism is either flow compensated or pressure compensated. A flow compensated system is one in which the displacement of the pumping mechanism is automatically reduced as the fluid output tends to exceed a predetermined maximum. A pressure compensated system is one in which the displacement of the pumping structure is reduced as the pressure in the outlet line of the device tends to exceed a predetermined maximum.

It is an object of this invention to provide pumping structure which is both flow and pressure compensated and in which the controlling components cooperate and coact in a manner such as to produce very desirable control characteristics.

A further object is to provide a system for both flow and pressure compensating pumping structure in which the interaction of the control components is such as to minimize the number and complexity of the required parts.

A still further object of this invention is to provide pilot valve controlled variable displacement pumping structure in which a single pilot valve is actuated by both variation of flow rate and variation in pressure in the pump outlet.

Further objects and advantages of the present invention will be apparent from the following description, reference being had to the accompanying drawing wherein a preferred form of the present invention is clearly shown.

In the drawing:

Figure 1 is an end elevation of pumping structure embodying the present invention.

Figure 2 is a section taken on line 2—2 of Figure 1.

Figure 3 is a partial section taken on line 3—3 of Figure 1.

Referring first to Figure 2 there is shown a body generally designated 10, having a central housing or frame member 12 to which an end bell 14 is secured by bolts 16 and a head 18 is secured by bolts 20. A drive shaft 22 is rotatably supported by a needle bearing 24 in the head 18 and a ball bearing 26 in the end bell 14. A conventional shaft seal 28 prevents leakage from the interior of the body 10 at the point of emergence therefrom of the shaft 22.

A central bore 30 extends through the face 32 of the central housing member 12 adjacent the head 18. A valve plate 34 fits snugly into the bore 30 to abut the face 36 of head 18, and is retained against rotation by a dowel pin 38. Valve plate 34 has extending therethrough a pair of arcuate inlet and outlet ports 40 and 42, respectively. A cylinder barrel 44, having a plurality of cylinder bores 46 therein, is in axial abutment with the valve plate 34. Cylinder barrel 44 is radially supported by the drive shaft 22 at the splined driving connection 49.

Each of the cylinder bores 46 has therein a piston 48 having a flanged shoe 50, ball and socket connected thereto. Shoes 50, and hence pistons 48, are biased rightwardly by a spider 52 having a conical, central bore which engages a collar 54. Collar 54 is splined to the drive shaft 22. A spring 56 is disposed in the central bore of the cylinder barrel and urges the collar 54 and the cylinder barrel 44 in opposite directions. The shoes 50 abut a swash plate 58 having a wear plate 60 thereon.

The swash plate 58 is pivotally supported on a pair of trunnions 62 which extend into bosses 64 on the central housing member 12. A spring 66 is interposed between the swash plate and the housing member 12 and biases the swash plate 58 to a position in which maximum travel of the pistons 48 will be induced by rotation of the cylinder barrel 44. At the opposite side of the housing from the spring 66, a control cylinder bore 68 is provided which has a control piston 70 slidable therein. A thrust rod 72 extends from control piston 70 to contact the swash plate 58. Fluid pressure acting on the end area 74 of control piston 70 will urge the swash plate 58 in a direction such as to compress the spring 66 and induce reduced displacement of the pumping structure. The foregoing description of the pumping structure has been abbreviated since it is in most part conventional and the invention is applicable to variable displacement pumping structure of any description.

Head 18 has therein a pair of threaded external connection ports 76 and 78. Port 76 communicates with the kidney-shaped inlet port 40 and port 78 communicates through a delivery passage 80 with the outlet port 42. The outlet passage 80 is threaded at 82 to receive a restriction plug 84.

A stepped bore 86 extends through the head 18 and is closed at its outer end by a cap 88. The small diameter of bore 86 is intersected in a spaced apart relation by a pair of laterally extending passages 90 and 92. Passage 92 extends from the bore 86 to communicate with the outlet passage 80 at a point upstream from the restriction 84. Passage 90 extends outwardly into communication with an axial passage 94 which extends into communication with the control cylinder bore 68, adjacent the area 74 of the control piston 70. For construction purposes the hole 90 extends from the exterior of the head 18, where it is closed by a plug 96. The inner end of bore 86 communicates with a radial groove 98 in the valve plate 34 which in turn communicates with the low pressure maintained in the interior of the pump body.

A pilot valve 100 is slidable in the bore 86 and includes a land 102 and an annular groove 104. Valve 100 is shiftable in opposite directions from the central position illustrated to alternately connect the control cylinder 68 either with low pressure, through the inner end of the valve bore and groove 98, or with the high pressure of the outlet passage 80 upstream of restriction 84, through the passage 92 and groove 104.

The outer end of pilot valve 100 is enlarged to form a piston 106 which engages the large diameter of bore 86 in fluid sealing engagement. The piston 106 divides the enlarged part of bore 86 into a pair of pressure chambers 108 and 110. A spring 112 in the pressure chamber 108 biases the pilot valve 100 to a position such as to vent the control piston to low pressure, thus inducing maximum displacement of the pumping mechanism.

A drilled passage 114 extends from the delivery passage 80 at a point upstream of the restriction 84 to communicate with the pressure chamber 110. A passage 116 extends from the delivery passage 80 at a point downstream of the restriction 84 to communicate with the pressure chamber 108. Passage 116 is constricted at 118 for a purpose hereinafter described.

A stepped bore 120 extends from the upper face of head 18 to intersect bore 86 at a point such as to communicate with the pressure chamber 108. The small diameter 122 of bore 120 has therein a valve spool 124. Valve spool 124 is biased to the position illustrated by a spring 126 which is restrained at its outer end by a cover 128. Spool 124 has a drilled hole 130 extending axially thereof which is intersected by a transverse, through hole 132. In the normal spring biased position of valve 124, the transverse hole 132 is isolated from the chamber 134 which is formed by the enlarged portion of bore 120 and the cover 128. Spring 126 is selected to have a load such that valve 124 will be maintained in the illustrated position until a predetermined maximum pressure has been reached. As the pressure in chamber 108 reaches this predetermined maximum, spool 124 will be urged upwardly against spring 126 and the hole 132 will communicate with the chamber 134 thus connecting the chamber 108 to chamber 134. Chamber 134 is vented to the low pressure of the pump inlet zones through a passage 135. As heretofore noted, the passage 116 which interconnects chamber 108 and the delivery passage 80 downstream of constriction 84 is restricted at 118. Thus when chamber 108 is vented, by operation of valve 124, the pressure in chamber 108 will be reduced and the pressure in chamber 110 will tend to shift the valve 100 rightwardly against the biasing force of spring 112. As heretofore noted, rightward shifting of valve 100 is effective to port fluid from the pump delivery passage, upstream of orifice 84, to the control piston, thus inducing reduced pump displacement.

In operation, the device would normally be driven by a variable speed prime mover connected to the drive shaft 22. During low speed operation the spring 112 will maintain the pilot valve 100 shifted to the left so as to vent the control cylinder and permit the spring 66 to bias the swash plate 58 to a position such as to induce maximum displacement of the pumping structure. At these low speeds the maximum delivery per revolution of the pumping mechanism will pass through the delivery port 42 into the delivery passage 80 and through the restriction 84 to the external delivery connection port 78. The pressure differential across the constriction 84, which also exists between pressure chambers 108 and 110, will not be sufficient in reacting against the opposed areas of the piston 106 to compress the spring 112. As the speed of the pumping mechanism increases, however, the pressure differential across the constriction 84, and hence between chambers 108 and 110, will act on the opposed areas of the piston 106 to overcome the initial load of spring 112 and shift the valve 100 rightwardly. As valve 100 moves to the right of the position illustrated, high pressure fluid from the delivery passage 80, upstream of constriction 84, will be conducted to the control cylinder 68 through the annulus 104 of the valve 100, thus inducing displacement reduction. At all speeds above the critical one at which displacement reduction starts, the opposed pressures in chambers 108 and 110 will shift pilot valve 100 to control the displacement of the pumping mechanism so as to maintain a substantially constant pressure drop through the constriction 84. Thus, as the pump delivery tends to exceed a predetermined maximum the swash plate 58 will be shifted to maintain a substantially constant delivery rate. The pumping mechanism is by this means flow compensated, and the structure provided for this purpose by the present invention is of a simple, low cost, and compact nature.

In addition to flow compensating the pumping mechanism, the present invention provides a system for pressure compensating which cooperates with the flow compensating structure in a manner such as to require minimum additional structure and which will operate in an efficient manner.

As operating pressures in the system reach a predetermined maximum, as established by the spring 126 of the relief valve 124, the valve 124 will be lifted from the position illustrated to vent the pressure chamber 108 to the low pressure of the pump inlet zones. The flow thus induced across the restriction 118 in the passage 116 causes a reduction of pressure in chamber 108 resulting in a pressure unbalance acting on the opposed areas of the piston 106. The pressure in chamber 110 will induce rightward movement of the pilot valve 100 which, as heretofore noted, results in shifting of the swash plate 58 to a position of reduced displacement. Such an arrangement reduces power loss due to excessive pressures to a minimum since only a small quantity of high pressure fluid must be diverted through the relief valve 124 to produce sufficient pressure drop in chamber 108 to start displacement reduction.

There is thus provided variable displacement pumping structure which is efficient, compact, and capable of low cost manufacture and which is both flow compensated and pressure compensated.

While the form of embodiment of the invention as herein disclosed constitutes a preferred form, it is to be understood that other forms might be adopted, all coming within the scope of the claims which follow.

What is claimed is as follows:

1. A combined flow and pressure compensating system for pumping structure having a member shiftable under fluid pressure to vary the displacement thereof, comprising in combination: pilot valve means for controlling said shiftable member; a fluid motor coupled to said pilot valve, said motor having a pair of opposed areas; means for producing a pressure differential dependent on the pump output rate; means for directly applying said differential pressure to said opposed areas to control the operation of said pilot valve; and means, responsive to a predetermined pump discharge pressure, for varying said directly applied differential irrespective of output rate to control said pilot valve so as to shift said member to reduce pump displacement.

2. A combined flow and pressure compensating system for pumping structure having a member shiftable under fluid pressure to vary the displacement thereof, comprising in combination: means forming a restriction to flow in the outlet of said pumping structure; pilot valve means for controlling said shiftable member; means forming a pair of pressure chambers having areas shiftable under pressure to induce movement of said pilot valve in opposite directions; constricted passage means extending from downstream of said flow restricting means to communicate with that one of said chambers in which an increase in pressure tends to induce greater displacement; passage means extending from upstream of said flow restricting means to communicate with the other of said chambers; and relief valve means for venting said one chamber in response to excess pressure, whereby said pumping mechanism will be both flow and pressure compensated.

3. A combined flow and pressure compensating system for pumping structure having a member shiftable under fluid pressure to vary the displacement thereof, comprising in combination: means forming a restriction to flow in the outlet of said pumping structure; pilot valve means for controlling said shiftable member; resilient means biasing said pilot valve in the direction of inducing greater displacement; means forming a pair of pressure chambers having areas shiftable under pressure to induce movement of said pilot valve in opposite directions; constricted passage means extending from downstream of said flow restricting means to communicate with that one of said chambers in which an increase in pressure tends to induce greater displacement; passage means extending from upstream of said flow restricting means to communicate with the other of said chambers; and relief valve means for venting said one chamber in response to excess pressure, whereby said pumping mechanism will be both flow and pressure compensated.

4. A combined flow and pressure compensating system for pumping structure having a member shiftable under fluid pressure to vary the displacement thereof, comprising in combination; means forming a restriction to flow in the outlet of said pumping structure; pilot valve means for controlling said shiftable member, said pilot valve being movable to alternatively vent said shiftable member or connect it to said outlet passage; means forming a pair of pressure chambers having areas shiftable under pressure to induce movement of said pilot valve in opposite directions; constricted passage means extending from downstream of said flow restricting means to communicate with that one of said chambers in which an increase in pressure tends to induce greater displacement; passage means extending from upstream of said flow restricting means to communicate with the other of said chambers; and relief valve means for venting said one chamber in response to excess pressure, whereby said pumping mechanism will be both flow and pressure compensated.

5. A combined flow and pressure compensating system for pumping structure having a member shiftable under fluid pressure to vary the displacement thereof, comprising in combination: means forming a restriction to flow in the outlet of said pumping structure; pilot valve means for controlling said shiftable member, said pilot valve being movable to alternatively vent said shiftable member or connect it to said outlet passage upstream of said restriction to flow; means forming a pair of pressure chambers having areas shiftable under pressure to induce movement of said pilot valve in opposite directions; constricted passage means extending from downstream of said flow restricting means to communicate with that one of said chambers in which an increase in pressure tends to induce greater displacement; passage means extending from upstream of said flow restricting means to communicate with the other of said chambers; and relief valve means for venting said one chamber in response to excess pressure, whereby said pumping mechanism will be both flow and pressure compensated.

References Cited in the file of this patent

UNITED STATES PATENTS

| | | |
|---|---|---|
| 2,102,865 | Vickers | Dec. 21, 1937 |
| 2,238,061 | Kendrick | Apr. 15, 1941 |
| 2,424,035 | Ifield | July 15, 1947 |
| 2,600,632 | French | June 17, 1952 |
| 2,600,633 | French | June 17, 1952 |
| 2,683,485 | Harris | July 13, 1954 |
| 2,716,946 | Hardy | Sept. 6, 1955 |
| 2,742,862 | Banker | Apr. 24, 1956 |
| 2,768,582 | Klessig et al. | Oct. 30, 1956 |
| 2,768,585 | Hardy | Oct. 30, 1956 |